United States Patent Office 2,856,422
Patented Oct. 14, 1958

2,856,422

PURIFICATION PROCESS FOR ALKALINE EARTH METAL SULFONATES

LeRoi E. Hutchings, Crystal Lake, Ill., assignor to The Pure Oil Company, Chicago, Ill., a corporation of Ohio No Drawing. Application August 13, 1956
Serial No. 603,811

7 Claims. (Cl. 260—504)

This invention relates in general to a process for the purification of hydrocarbon sulfonates, resulting from the neutralization of hydrocarbon sulfonic acids prepared by the reaction of a sulfonatable material with a sulfonating agent, wherein the undesirable insolubles are separated in a particular manner and the purified product is characterized by its ability to pass the water susceptibility test.

It has been found that if the reaction product from a hydrocarbon sulfonation process, particularly an oil sulfonation process, is neutralized with a basic metal salt, the mixture heated to complete the reaction and drive off the solvent present, and filtered in accordance with the accepted prior art methods, the product does not pass the water susceptibility tests hereinafter described. The products, although acceptable as detergents for ordinary purposes, are not acceptable where storage conditions are such that contact with water is not completely avoidable. Also, the presence of finely divided solids and water-soluble sulfonates in these products tends to stabilize water-oil emulsions, which, for some end uses such as automotive lubricant additives, is highly undesirable. The cloudiness developed during the water susceptibility tests is probably due to the presence of low-molecular-weight metal sulfonates and metal sulfates, which are primarily the result of the formation of so-called green acids or dibasic acids during the sulfonation, and the trace amounts of water present in the reaction components. According to this invention, it has been found that finished sulfonates having satisfactory water susceptibility properties can be prepared by a purification process wherein the sulfonic acids, in oil and in admixture with specific solvents, are first neutralized by addition of a metal base, and are then filtered through an efficient filtering material in the presence of a solvent for the sulfonate phase which is an anti-solvent for the impurities. It has been found that the presence of a solvent of this nature is essential during the filtration step.

Accordingly, it is a primary object of this invention to provide a purification process whereby finished sulfonates capable of passing the water susceptibility tests can be prepared.

Another object of the invention is to provide a particular sequence of purification steps which produces the unusual degree of purification necessary to render sulfonates highly acceptable as lubricating oil addends.

These and further objects of the invention will appear in part or in whole as the description of the invention proceeds.

The prior art recognizes the problem of suspended or dissolved inorganic salts or impurities and low-molecular-weight sulfonic acids in a sulfonated mixture. It is known to apply a solvent extraction step followed by filtration for their removal, but filtration alone is known to be inadequate for this purpose. Treatment of the sulfonate mixture, after neutralization, with 3–10% sodium chloride solution in about 10–25% of alcohol or methyl ethyl ketone, separation of the oil phase therefrom and filtering the oil phase, followed by heat treatment to drive off the solvent, has been proposed to solve this problem. However, it has been found in accordance with this invention that this prior art sequence of steps does not produce a product which passes the water susceptibility tests.

Filtration in the presence of such solvents as hexane or benzene, after neutralization and washing, also is inadequate for the present purposes. Furthermore, the choices of solvent and solvent-oil ratio are critical to the end result. Also, the practice of separating a water phase after the neutralization step, before filtering, results in a loss of neutralizing agent which, although it may in some instances produce a sulfonate that will pass the water susceptibility tests, is to be avoided. Other investigators have proposed the removal of sulfuric acid and low-molecular-weight sulfonic acids prior to neutralization. Methods which have been proposed to accomplish this have involved filtration or contacting of the crude sulfonic acids with various media prior to neutralization. However, these methods and/or processes are generally applied to cases in which a gross amount of impurities are present, and do not result in the production of products of satisfactory water susceptibility properties. Moreover, some of the methods practiced have resulted in large losses of oil-soluble sulfonates.

In this invention, I have discovered that sulfonates resulting from the neutralization of sulfonic acids formed by the reaction of a sulfonatable material, such as mineral oils, with a sulfonating agent can be adequately purified to pass the water susceptibility tests described below by filtering the sulfonates in oil, and mixed with certain specific solvents, through certain types of filtering materials having extended surfaces, prior to removal of the solvent from the mixture. I have found the presence of a solvent which is miscible with the oil phase and immiscible with the water phase to be essential during the filtering step.

The "water susceptibility tests" which were used as the criteria for evaluating the end-product of this invention are known. While such tests do not normally appear in specifications for lubricating oils or lubricating oil additives, they are useful and significant in that they give an indication of the performance of finished oils containing the sulfonates with respect to potential emulsion formation with water, and also give an indication of the stability of the sulfonate-containing additive when in storage under adverse conditions, that is, for example, in wet tanks.

The water susceptibility test referred to in the specification as a "blend test" is a measure of the performance to be expected of the sulfonate when incorporated in a crankcase oil, and is conducted in the following manner: A finished blend of the oil and additive or additives, in proportions normally used in crankcase oil formulations, is first prepared and agitated for ½ hour at room temperature with 0.1% by weight of water present. The mixture is then observed for cloudiness and precipitation and allowed to stand. Additional observations of the amount of haze and/or insoluble materials present are made at the end of 24 and 48 hours standing. If the water separates quickly from the blend and leaves a clear solution, and if there is no precipitate formation, the blend is considered to have passed the test.

The second water susceptibility test is referred to as the "concentrate test." In this test, 4 parts by volume of a base oil, and 1 part by volume of the additive are blended together, and this concentrate is agitated for ½ hour in the presence of 1.0% by weight of water. After observation for haze and precipitates, it is placed in a constant temperature bath at 250° F. where it is agitated with nitrogen stripping for 2 hours to remove the added water. Again an observation is made and the test sample is allowed to stand. After 24 hours another observation is made and the amount of precipitate is noted and recorded. The blend should be completely reconstituted, that is, there should be no precipitates and a clear, stable solution should be attained following this process. In a number of experiments not reported herein it was found that various samples of commercially produced barium sulfonates did not pass the "blend test." Furthermore, various samples of barium sulfonates prepared from petroleum sulfonic acids and distributed as lubricating oil additives were found to fail both the blend test and the concentrate test. Barium petroleum sulfonates prepared and purified in accordance with this invention, even though allowed to stand for long period of time or subjected to extended adverse storage conditions, were found to pass both the blend and concentrate water susceptibility tests. Where the term "water susceptibility test" is used in this specification, reference is made to either or both of the concentrate and blend tests.

In order to demonstrate the invention the following examples are given.

Example I

A 374-gram portion of a 200 viscosity, 85 V. I., finished neutral oil, diluted with 1290 cc. of ethylene chloride, was sulfonated by reaction with 18.7 gms. of sulfur trioxide diluted with 145 cc. of ethylene chloride. The reaction was conducted by contacting the oil-solvent mixture and the sulfur trioxide-solvent mixture in a continuous, co-current system wherein the two mixtures were brought together, at a temperature of about 32° F. maintained by a water-ice bath, by spraying the sulfur trioxide mixture into the flowing oil stream to obtain turbulent mixing. One-half of the resulting reaction mixture was neutralized with 18.7 gms. of barium hydroxide octahydrate dissolved in 200 cc. of water. The neutralization was carried out at the boiling point of the mixture, namely 160° F. By the method of this invention, the neutralized product mixture was then filtered through a one-half inch layer of "Celite" filter aid supported on filter paper in a Buchner funnel, and the clear product was freed of solvent and water by heating to 350° F. for 30 minutes with nitrogen stripping. The resulting sulfonate-oil mixture was then passed through fresh "Celite" filter aid again, and an exceptionally clear, reddish-brown product was obtained. This product contained 4.3 wt. percent of barium, had a base number of 11.2, and passed both water susceptibility tests. Two filtration stages were used in this instance because the large excess of base used tended to absorb carbon dioxide from the air and form insoluble carbonates. Filtration in the absence of solvent is sufficient to remove such impurities. Where no large excess of base is used, one filtration stage using a filter aid is sufficient to effect purification for purposes of the water susceptibility tests.

Example II

Solvent and water were removed from the other half of the mixture of sulfonic acids, solvent, and oil of Example I after neutralization, but before filtration. The product was then filtered through "Celite" filter aid. The resulting sulfonated oil did not pass the water susceptibility tests.

Example III

A 316.6-gram portion of 200 viscosity, 85 V. I., finished neutral oil was diluted with 728 cc. of ethylene chloride, and the mixture was cooled to 32° F. This solution was then contacted with a solution of 15.8 gms. of sulfur trioxide in 65 cc. of ethylene chloride, in the manner described in Example I, at 36° F.

One-half of the resulting mixture of solvent, sulfonic acids and oil was neutralized with 25 gms. of barium hydroxide octahydrate dissolved in 50 cc. of water, after which the solvent and water were removed by heating to 350° F. for one-half hour with nitrogen stripping. The resulting sulfonate-oil mixture was then passed through "Celite" filter aid. The slightly cloudy product which was thus obtained did not pass the water susceptibility tests.

The other half of the sulfonic-acid-solvent-oil mixture of Example III was neutralized with a slight excess of barium hydroxide octahydrate. Only a few drops of water were added during this neutralization. The neutralized product solution, still containing solvent, was then filtered through filter aid, after which most of the solvent was removed. The product was then made basic by the addition of more base, which had been purified by filtration in hot aqueous solution, after which water and the remaining solvent were removed by heating to 350° F. for thirty minutes with nitrogen stripping. The resulting product was filtered through filter aid. A very clear product which passed both water susceptibility tests was obtained.

Example IV

Sulfonic acids were prepared by treating 200 vis. finished neutral oil, dissolved in twice its volume of ethylene dichloride, with 6% w. of sulfur trioxide dissolved in five volumes of ethylene chloride, at 25° C. Part of the resulting product was treated according to the method of Example I and a satisfactory product passing the water susceptibility tests was obtained.

Example V

A second portion of the acids from Example IV was neutralized, and the reaction mixture was filtered through wet cotton-twill filter cloth. The resultant filtrate still contained undesirable solids. This filtrate was then passed through ½" of felt, with like results, and did not pass the water susceptibility tests. The experiment shows that filtration by use of the usual filtering media, such as paper, cloth, and felt, even with the solvent present does not yield a satisfactory product.

Example VI

Still another portion of these acids was neutralized, and the solvents and water were removed by heating at 350° F. for one-half hour. Water and hexane were then added to the sulfonate-oil mixture, and the resulting mixture was filtered through filter aid. This material, even though apparently clear, did not pass the water susceptibility test.

Example VII

One hundred grams of 200 vis., 85 V. I., finished neutral oil which had been solvent extracted, dewaxed and clay contacted were treated with 8 grams of sulfur trioxide. The oil was thoroughly mixed with 4 volumes of liquid sulfur dioxide at atmospheric pressure prior to the slow addition of the sulfonating agent which consisted of said sulfur trioxide dissolved in 5 volumes of liquid sulfur dioxide at atmospheric pressure. The sulfonation took place at about 14° F. and the total contact time was about 10 minutes. At the end of the sulfonation, all of the sulfur trioxide had reacted. Next, about 0.5 volume (oil basis) of toluene was added to the mixture to keep any sulfonic acids from separating out during sulfur dioxide removal, and to fluidize the oil phase so that it could be completely removed from the Dewar vessel in which the sulfonation was conducted. The sulfonation reaction mixture was then poured into a large beaker and the sulfur dioxide was stripped out of the reaction mixture by means of mild heating and stripping with nitrogen. The acid number of the oil at this point was about 44. The sulfur-dioxide-free sulfonic acid mixture was then treated with 80% of the theoretical amount of barium carbonate required to neutralize the sulfonic acids. No water was added. Although the mixture was stirred vigorously and heated, the acid number of the product was only reduced to 27, and most of this reduction could be attributed to acid sludge loss and thermal decomposition of the acids, rather than to neutralization. The product was then neutralized with barium hydroxide octahydrate in water solution and filtered, following removal of solvent and water as in Example II. This product did not pass the water susceptibility test.

*Example VIII*

A mixture of 100 grams of 200 vis., 85 V. I., neutral oil and 300 cc. of liquid sulfur dioxide at 14° F. was treated with 8 grams of sulfur trioxide dissolved in 20 cc. of liquid sulfur dioxide. The mixture was thoroughly agitated for about 5 minutes. At the end of this time, 100 cc. of toluene was added and the mixture was poured into a large vessel. Nitrogen was passed through the mixture while constant stirring was applied. The mixture then was heated gently to bring the temperature to about 150° F. When sulfur dioxide was no longer detectable in the vapors rising from the product, 7.9 grams of barium carbonate were added along with 3 cc. of water. This represented about 3.0 wt. percent of water based on the original oil charged. The mixture was then maintained at 150° F., and agitation was applied vigorously for about 10 minutes. Thereafter, 6.9 grams of barium hydroxide were added and vigorous agitation was applied while the reaction mixture was heated quickly at 350° F. The temperature was held at 350° F. until all of the water was driven off, which took about 30 minutes. The product was then ready for use, being substantially free of all solid matter, and having substantially all of the barium that was added incorporated therein as part of the finished product. The finished product had a sulfate ash content of 15.7% and a base number of 28.5. This product did not pass the water susceptibility test. However, if before the removal of water the product is diluted with about 100 to 300% (based on total product) of ethylene chloride (dichloride), 1,2-dibromoethane or halogenated hydrocarbons other than carbon tetrachloride and filtered, passage of the water susceptibility test is assured. Similar experiments to Examples VII and VIII show that replacement of the toluene with carbon tetrachloride, or various ethers and esters does not form a satisfactory product.

In summary, these experiments and discussion show that acceptable products are not formed if, after neutralization, the solvent and water are removed and the product is filtered through a filter aid; other solvents such as hexane, toluene, or carbon tetrachloride are used and the product is filtered through a filter aid; or a preferred solvent is used but the filter aid is omitted.

As seen from the foregoing examples, acceptable sulfonates which pass the water susceptibility test are formed by processing or purifying the sulfonic acid-containing reaction mixture in the following manner:

(1) Where no solvent is used during the sulfonation reaction, the reaction product is freed of any $SO_2$ by-product and treated with a solution (generally aqueous) of metal base to neutralize same and form the desired metal sulfonate or mixed metal sulfonate. The solvent or solvent mixtures of this invention are added and the reaction mixture is subjected to filtration through a filter aid having an extended surface and having the ability to retain those insoluble materials present or formed through the action of the added solvent. The filtrate is separated, the solvent is removed, as by heating and/or stripping with an inert gas such as nitrogen, and the purified product meeting the required water susceptibility tests is recovered.

(2) The product from procedure No. 1 (above) may be subjected to further filtration, with or without the addition of the solvents of this invention to separate any remaining insolubles and insure the stability of the product.

(3) The solvent or solvent mixtures of this invention may be added before or during the neutralization step in carrying out procedure No. 1.

(4) Where sulfur dioxide is used as a solvent during the sulfonation reaction, procedure No. 1, 2 or 3 may be followed with proper adjustment of the conditions and time of treatment to remove all of the sulfur dioxide prior to neutralization.

(5) The solvent or solvent mixtures of this invention may be added or be present during the sulfonation reaction, with or without additional sulfur dioxide, in which event the by-product sulfur dioxide or solvent sulfur dioxide is next removed, leaving the solvent (first mentioned) behind, and the neutralization, filtration and solvent removal steps described in procedures 1, 2, 3 and 4 are then carried out.

(6) The solvent or solvent mixtures of this invention may be added after the neutralization step and the reaction product-solvent mixture is treated to filtration through a filter aid having an extended surface and sufficient retentive ability to withdraw the insolubles from the mixture. Following this, the filtrate is separated, the solvent removed and the purified sulfonates are recovered.

The improved purification process of my invention may be applied to hydrocarbon oil-sulfonating-agent reaction mixtures using an oil containing at least 10% to 40% of sulfonatable material and capable of producing oil-soluble sulfonates as described in the prior art. The sulfonating agent may be sulfur trioxide, either liquid or gaseous and preferably modified by dilution with an inert carrier, sulfuric acid, or sulfuric acid-sulfur trioxide mixtures. The reaction product to be purified may result from the reaction of a hydrocarbon oil and a sulfonating agent under a broad range of conditions. The temperature of the sulfonation reaction may vary from −30° F. to 100° F. or higher. In using liquid sulfur trioxide dissolved in an inert carrier as the sulfonating agent, the optimum reaction conditions are about 10° to 50° F., under which conditions a minimum amount of insoluble impurities are obtained. Various petroleum oil fractions may be used as the feed oil for the process including lubricating oil fractions, both refined and unrefined. Refined neutral lubricating oils and bright stocks are good starting materials. The reaction may be carried out on a batch or continuous scale.

The solvent used in accordance with this invention to effect the desired separation of insolubles during the filtration step in the presence of a filter aid is a halogenated hydrocarbon having more than one carbon atom, boiling at a point below that of the sulfonate mixture, and containing one or more halogen atoms, such as ethylene chloride or ethylene bromide. The monohalogen derivatives of paraffins such as ethyl chloride, bromide, and iodide; n-propyl chloride, bromide and iodide; isopropyl chloride, bromide and iodide; n-butyl bromide, chloride and iodide; sec-butyl bromide, chloride and iodide, the latter boiling at 248° F., may be used. Similarly, isobutyl chloride, bromide and iodide; tert-butyl chloride, bromide and iodide; n-amyl chloride, bromide and iodide; tert-amyl chloride, bromide and iodide; neopentyl chloride, bromide and iodide; and n-hexyl fluoride, bromide and iodide, the latter boiling at 338° F., may be used. Other specific examples of monohalo-paraffins having boiling points below the boiling point of the sulfonate mixture are n-heptyl fluoride, n-heptyl chloride, n-heptyl bromide, n-octyl fluoride and n-octyl chloride. The primary alkyl halides are preferred because of their chemical and thermal stability. Tertiary halides containing more than 6 carbon atoms are unstable and therefore unsuitable. The saturated dihalides containing more than one carbon atom such as the ethylidene halides, ethylene halides, ethylene chlorobromide, ethylene chloroiodide, propylidene halides, propylene halides, trimethylene halides and the trihalides such as methyl chloroform, 1,1,2 trichloroethane and glyceryl chloride, meeting the aforementioned boiling characteristics, may be used. The halide solvent used must be inert, must be miscible with the oil phase and must not be soluble in any water phase present. Ethylene chloride and ethylene bromide are the preferred solvents for the process.

The metal base used in the neutralization step may be any hydroxide or oxide of a group II metal such as calcium, strontium, or barium. Other metal salts such as carbonates, acetates and chlorides of magnesium, cadmium, or other metals, may be used with approximate changes in neutralization conditions as are known in the art.

The neutralization with the above bases is completed by maintaining the mixture at an elevated temperature but below the boiling point of the solvent. Broadly, the temperature may vary from about 170° to 350° F., but where ethylene chloride is the solvent the highest temperature is about 200° F. Pressure may be used to permit higher neutralization temperatures, if desired. Although, according to the experiments so far performed, there does not appear to be any relationship between the base number of the neutralized product and its ability to pass the water susceptibility test, there is a connection between the clarity of the product and the passage of the test. A cloudy product will not pass the water susceptibility test. With regard to the base number, it was found that at very low base numbers of the neutralized products there is a tendency for the product to filter slowly. Accordingly, the amount of the base used must be in excess of the stoichiometric requirements to neutralize the product and must be less than 200% of that theoretically required for neutralization. This requirement is necessary in order that the excess base be totally assimilated into the solvent-sulfonate mixture either by reaction, dissolution, or both. It is contemplated that the process of the invention can be applied in restoring a cloudy product, or one which did not pass the water susceptibility test, into a clear product that passes the test. This is accomplished by taking up the cloudy product in a suitable solvent, making sure an excessive amount of base is present, and filtering in accordance with the invention. After completion of the neutralization, the reaction mixture is filtered through a suitable medium such as asbestos, Celite, Decalite, clays, Floridin, Filter-Cel, fine fuller's earth, bauxite, kieselguhr (diatomaceous earth), etc., to remove precipitated materials.

The filter aid used is characterized by its extended porous surface or body and its ability to retain the finest precipitated or colloidal particles thereon to remove same from suspension in the neutralized reaction mass. The filter aid should be of low specific gravity and porous, and must be inert to the reaction mass as well as insoluble in either phase thereof. Any amount of filter aid may be used. In general, about 1% to 50% by wt. based on the amount of neutralized reaction mass, is sufficient to properly clarify and purify the sulfonates. Once used, the filter aid may be washed to revivify same but is generally discarded, since it is uneconomical to attempt rejuvenation of such materials. Various types of filters may be used in the process, including gravity filters, pressure filters, intermittent vacuum filters and continuous vacuum filters.

As has been demonstrated, it is important that this step be carried out with solvent present, and that the filter medium remove all of the suspended solids present. The filtration is preferably carried out at elevated temperatures, again using pressure to prevent solvent evaporation. Following the filtration, the solvent and any water present are removed from the mixture by heating to the boiling point of water or of the solvent, whichever is higher. Solvent removal may be facilitated by stripping with an inert gas, such as nitrogen or superheated steam, under conditions of heating, or by applying a vacuum. At this point, the basicity of the sulfonate-oil mixture may be adjusted by adding additional base. An additional filtration step may be necessary after this second addition of base if the neutralizing material used is of low purity, or if sufficient base is added to cause the formation of additional insoluble materials. The preferred method is to perform the first neutralization, which is carried out in the presence of the solvent at temperatures above about 170° F., at an elevated pressure sufficient to substantially prevent evaporation of the water and solvent present, and with enough water present to assure complete solution of the added base. The temperature of this neutralization treatment may go as high as 200° F., with pressures ranging from 10 lbs. per square inch to 100 lbs. per square inch. The amounts of water necessary for this reaction range from about 1% to 10% based on the total amount of reaction mixture present. The mixture should be filtered at the same temperature and pressure to prevent the excess base from being precipitated and filtered out. The excess base then reacts with the neutral sulfonate to give a basic sulfonate during the water and solvent removal step. This imparts reserve alkalinity to the petroleum sulfonate, a highly desirable attribute when the sulfonate is used as a lubricating oil additive. It is important that sufficient time be allowed during the step to remove solvent and water for this reaction to take place. It is also important that a sufficient amount of water to promote this reaction be retained in the mixture during this step. Steam stripping to remove the solvent and/or recycling of water which has been removed by distillation is sufficient to accomplish this end.

In general, between about 100% to 500% of solvent (based on the weight of neutralized product) is sufficient to effect adequate purification during the filtration step. Between about 150% and 250%, on this same basis, is adequate for most petroleum sulfonate products. Enough solvent should be used to cause precipitation of the impurities and the amount of solvent necessary for this purpose depends on the concentration of the sulfonates in the sulfonate product. The use of an excessive amount of solvent may be deleterious and increases the volumes of materials to be handled and the burden on the solvent recovery system.

Some of the solvents, notably ethylene chloride, that are used during the purification step or steps in accordance with this invention, may be present during the reaction step, thus eliminating the necessity of prolonged stripping off of sulfur dioxide where the latter is used during the reaction. A short stripping step is generally necessary after the reaction, even when using the halogenated solvents of this invention, to remove any sulfur dioxide that may be formed during the reaction as a precaution against excessive consumption of neutralizing agent and the formation of increased amounts of insolubles to be separated. The solvent or solvent mixtures used during the purification step may be added to the reaction mixture initially, or added before or after the neutralization step. However, it is preferable to have a solvent present during the neutralization reaction to aid in its completion. If desired, the crude sulfonate mixture may be neutralized in the presence of one solvent, such as ethylene chloride, filtered, the filtrate subjected to distillation to remove the ethylene chloride, and another halogenated hydrocarbon, having more than one carbon atom, added to act as a precipitant during the final filtration step using the filter aid.

What is claimed is:

1. The method of purifying neutralized petroleum sulfonates selected from the group consisting of calcium petroleum sulfonate, strontium petroleum sulfonate and barium petroleum sulfonate and mixtures thereof, to obtain a product characterized by its ability to pass the water susceptibility tests which consists in dissolving an oil phase of said neutralized petroleum sulfonate in a solvent selected from the group consisting of ethylene chloride, ethylene bromide, 1,1-dichloroethane, ethyl chloride and ethyl bromide, said solvent being miscible with said oil phase and immiscible with any water phase, passing said solution through a filtering material selected from the group of diatomaceous earth, fuller's earth, filter clay, and bauxite and separating the filtered product from the solvent phase.

2. The method in accordance with claim 1 in which the solvent is ethylene chloride.

3. The method in accordance with claim 1 in which said neutralized petroleum sulfonate is barium petroleum sulfonate.

4. The process for the preparation of metal salts of petroleum sulfonic acids selected from the group consisting of calcium petroleum sulfonates, strontium petroleum sulfonates, barium petroleum sulfonates and mixtures thereof, said salts characterized by their ability to pass the water susceptibility tests which consists in sulfonating a mineral lubricating oil in the presence of about 1 to 3 parts of a solvent per part of said sulfonate, said solvent being selected from the group consisting of ethylene chloride, ethylene bromide, 1,1-dichloroethane, ethyl chloride and ethyl bromide, neutralizing the sulfonic acids so formed with an excess of an aqueous solution of a metal base of the aforementioned metals, at temperatures of about 150–200° F., filtering the neutralized heterogeneous mixture while maintaining said mixture at a temperature of about 150–200° F. and at a pressure sufficient to prevent vaporization of said solvent by passing said mixture through a filtering material selected from the group consisting of diatomaceous earth, fuller's earth, filter clay, and bauxite, and removing said solvent and water from the filtered product.

5. The method in accordance with claim 4 in which the petroleum lubricating oil used is a neutral mineral lubricating oil having the following characteristics, viscosity at 210° F. of 200 SUS and a viscosity index of 85.

6. The method in accordance with claim 4 in which the amount of base used is between about 120 and 200% of that theoretically required to neutralize the acids present.

7. The method in accordance with claim 4 in which the solvent is ethylene chloride and the metal base is barium hydroxide.

References Cited in the file of this patent

UNITED STATES PATENTS

| | | |
|---|---|---|
| 2,140,263 | Kessler et al. | Dec. 13, 1938 |
| 2,358,773 | Blumer | Sept. 26, 1944 |
| 2,615,925 | Asseff et al. | Nov. 4, 1952 |
| 2,703,788 | Morrisroe | Mar. 8, 1955 |
| 2,767,209 | Asseff et al. | Oct. 16, 1956 |
| 2,769,836 | Gilbert et al. | Nov. 6, 1956 |